Dec. 27, 1949     H. F. WILMS     2,492,608
INDUSTRIAL TRUCK
Filed March 26, 1946     4 Sheets-Sheet 1
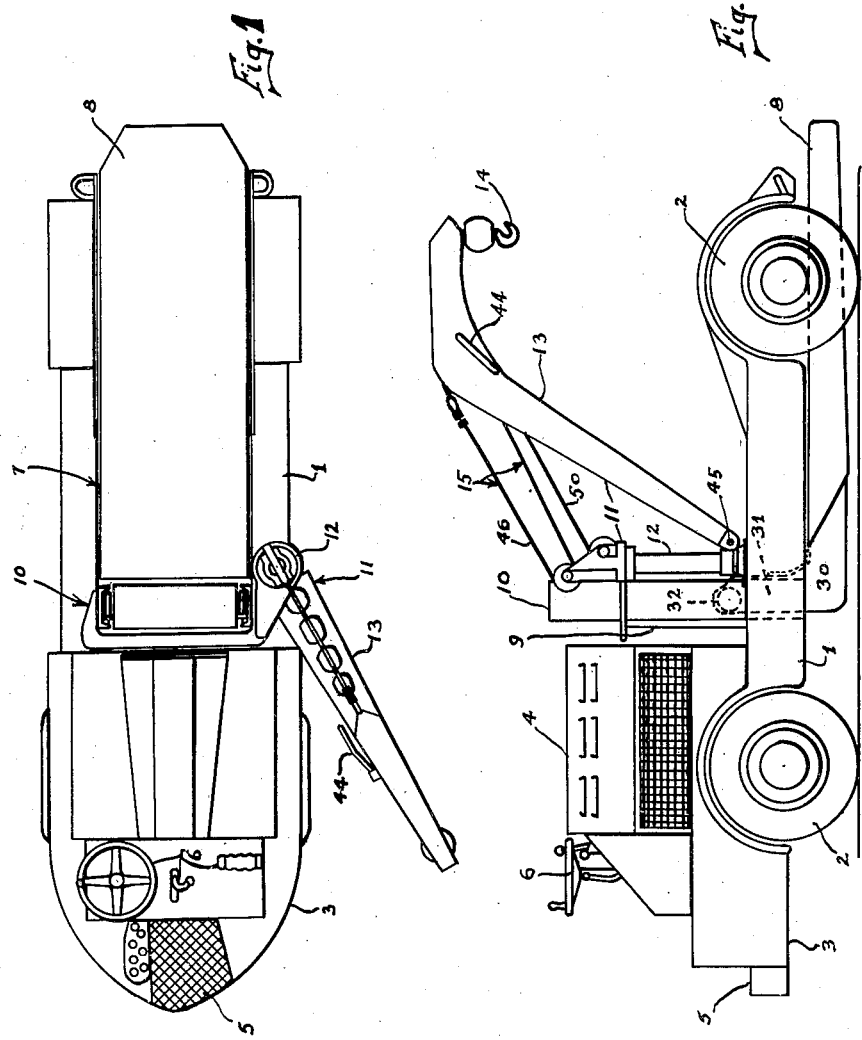
INVENTOR.
HENRY F. WILMS
BY Fay, Golrick & Fay.
Attorneys

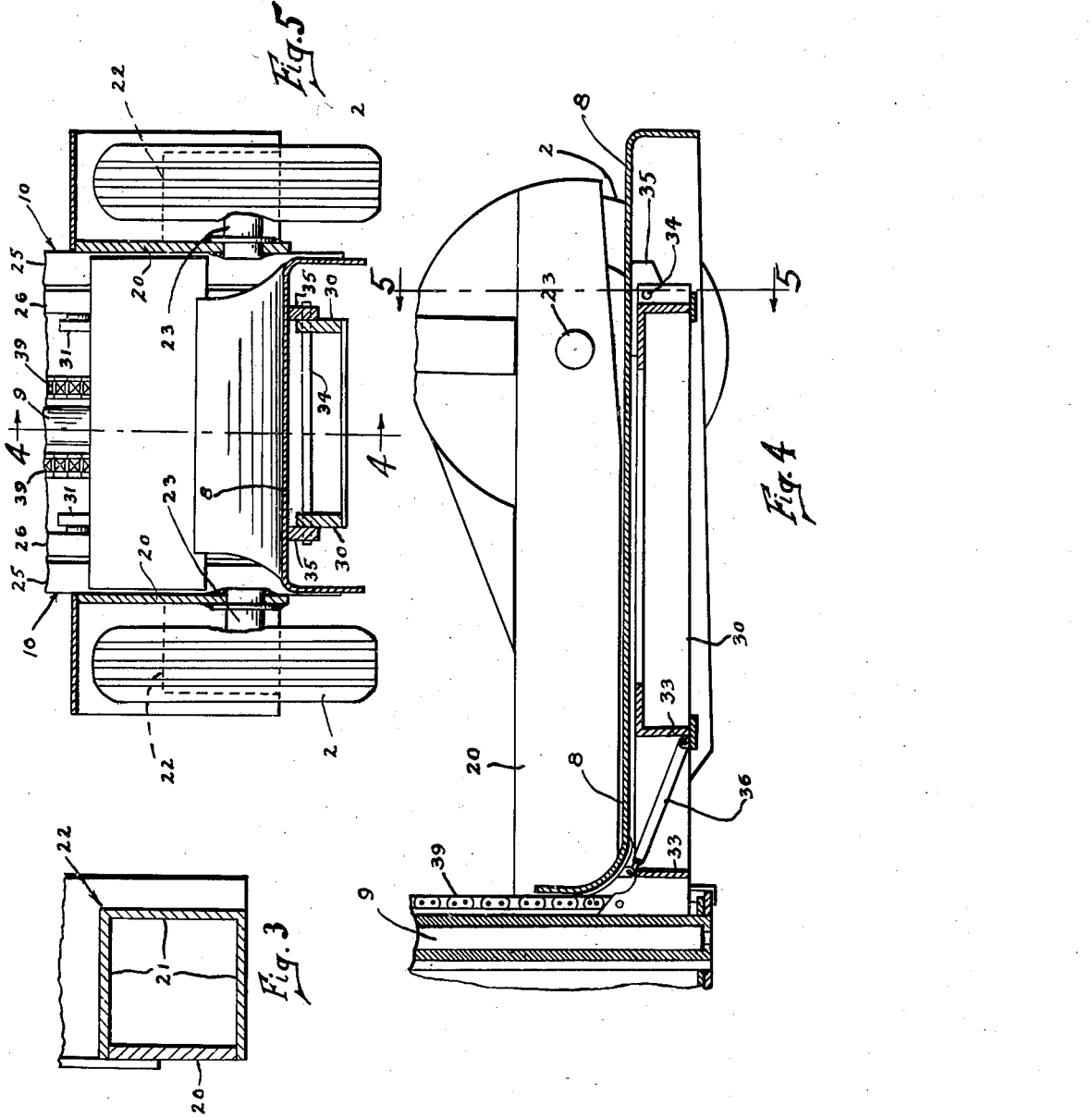

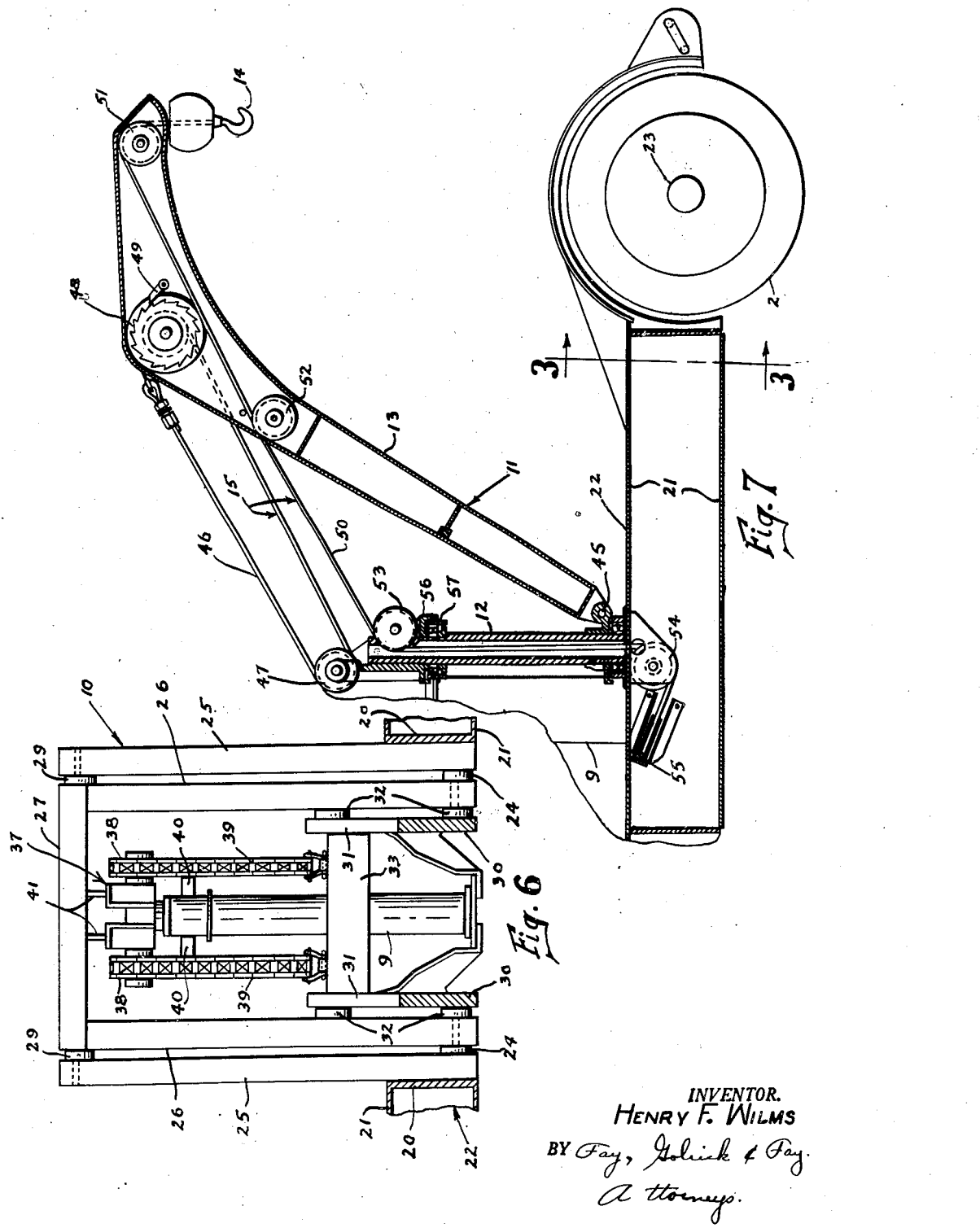

Dec. 27, 1949  H. F. WILMS  2,492,608
INDUSTRIAL TRUCK
Filed March 26, 1946  4 Sheets-Sheet 4

INVENTOR.
HENRY F. WILMS
BY Fay, Golrick & Fay.
Attorneys

Patented Dec. 27, 1949

2,492,608

UNITED STATES PATENT OFFICE 2,492,608

INDUSTRIAL TRUCK

Henry F. Wilms, Cleveland, Ohio, assignor to The Elwell-Parker Electric Company, Cleveland, Ohio, a corporation of Ohio Application March 26, 1946, Serial No. 657,265

1 Claim. (Cl. 214—65)

This invention relates to industrial trucks and especially trucks of the type adapted to straddle loads. It differs from conventional load handling apparatus in providing an elevatable platform which may operate from floor level to maximum elevated position within the frame of the truck and between the load bearing wheels without transverse reinforcing structurals, either overhead or otherwise.

Heretofore low lifting platform types of trucks have been constructed to have the truck frame or chassis extend beneath the platform and confined within the marginal boundaries of the load lifting platform. Since the load bearing capacity of the tires on the wheels attached to the chassis beneath the load platform determined the load lifting and transporting capacity of the truck various dual wheel and dual tire arrangements have been used to increase the truck transporting capacity. However, definite limitations on tire diameters remained.

In the tier-lift type of truck wheel size limitations did not exist to the same extent, but in this type the platform and supporting mechanism overhung the end of the truck, thus requiring counter-balancing factors which frequently increased the overall power burdens on the truck power plant. Furthermore, sufficient wheel diameter limitations still remained as to place definite restrictions upon the transporting speed at which the truck could be operated without undue depreciation.

It is accordingly the primary object of the invention to provide a simplified dirigible mobile vehicle of a modified tier-lift type adapted to receive loads at low levels so that the center of gravity of the load falls within a four-point suspension of the truck without interference from truck framing, or axles, and without the provision of overhead cross bracing structures. It is a collateral object to take advantage of such load distribution by the employment of relatively large diameter, pneumatically-tired wheels, whereby the load may be transported safely at road speeds heretofore found to be impractical.

Other objects and advantages will become apparent hereinafter when the following specification is read in conjunction with the accompanying drawings in which:

Fig. 1 is a plan view of one embodiment of the invention;

Fig. 2 is a side elevation view of the device shown in Fig. 1 with the boom hoist shown in a different position;

Fig. 3 is a cross-sectional view taken along line 3—3 of Fig. 7 illustrating certain details of construction;

Fig. 4 is a fragmentary mid-sectional elevational view taken along line 4—4 of Fig. 5;

Fig. 5 is a fragmentary sectional elevational view taken along line 5—5 of Fig. 4;

Fig. 6 is a fragmentary front elevational view showing certain details of the load supporting lift;

Fig. 7 is a fragmentary elevational view shown partly in section illustrating details of the boom hoist, and;

Figure 8:
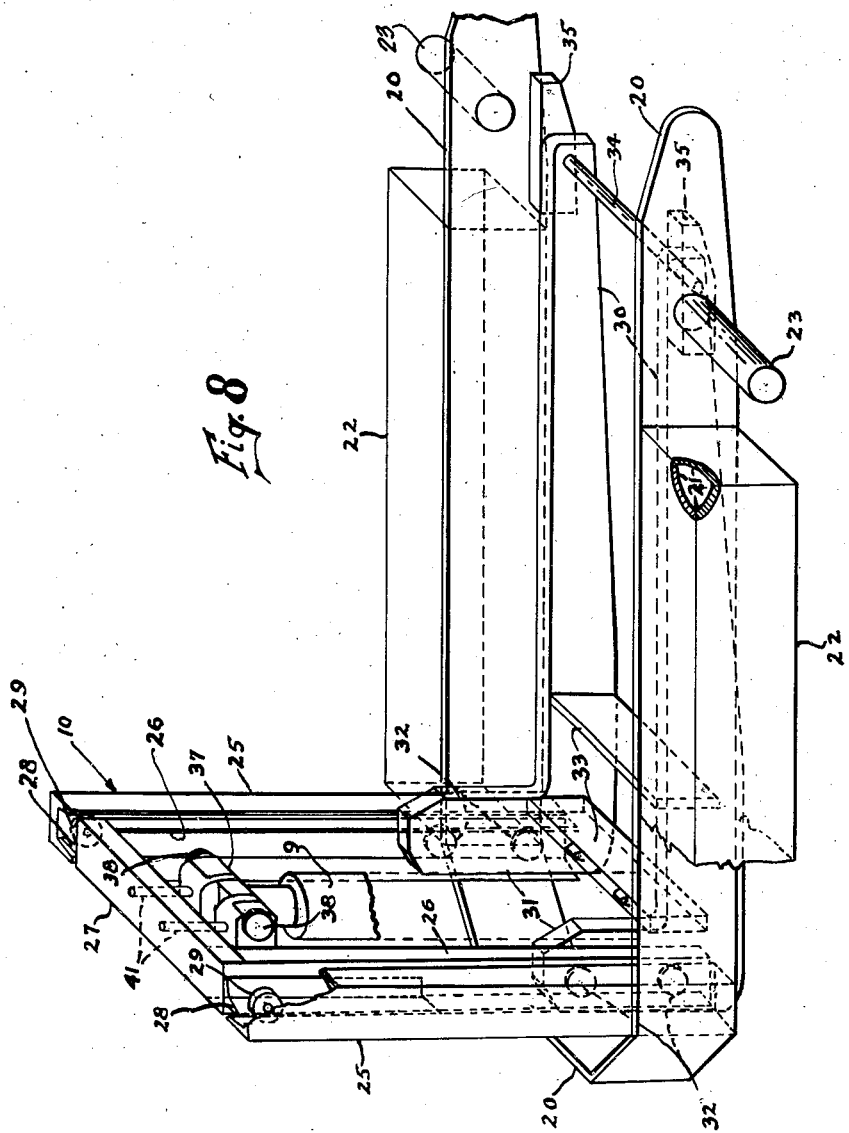
Fig. 8 is a perspective view illustrating details of frame and associated parts.

Referring now more specifically to the drawings in which like reference characters refer to like parts throughout as shown in Figs. 1 and 2, the truck comprises a chassis 1 having four comparatively large load supporting pneumatic wheels 2 journalled on opposite sides of the chassis in opposing relation. At one of its ends the chassis is provided with an extension 3 on which is mounted a motor 4 of appropriate design and an operator's platform 5 with which is associated the necessary controls 6. The wheels 2 beneath the power plant are dirigible and steered from the operator's position on the platform 5.

At its other end the chassis is bifurcated to provide a load supporting well 7 which extends from a point on the chassis adjacent the motor 4 outwardly beyond the wheels 2 at the far end of the truck.

Within the well 7 is disposed an elevatable platform 8 which is adapted to be raised and lowered through the horizontal plane of the axis of the wheels that straddle it. This is made possible by the use of stub axles independently mounted in opposed relation upon each of the legs of the U-shaped frame which will be described in greater particular hereinafter. The vertical translation of the platform 8 is effected by a hydraulic piston 9 and associated telescoping trackways 10 which will be more fully described hereinafter.

To facilitate the handling of certain classes of loads to and from the platform 8, a boom hoist 11 comprising a vertical stanchion 12 and a traversable boom 13 is footed on portions of the frame adjacent the platform and is adapted to be swung to and from positions overlying the latter. The boom is provided with a hoisting hook 14 and the necessary connecting lines 15 by which the hook and the boom, respectively, are raised and lowered.

Referring particularly to Fig. 8, it will be seen that sufficient strength and rigidity is afforded the bifurcated chassis without the need for overhead transverse structurals by means of a U-shaped frame 20 that is composed of heavy plate sections arranged with their greatest transverse dimension in the vertical and integrally connected to define a load carrying well in which the platform 8 is adapted to be disposed. To lend greater rigidity and strength, plate sections 21 of lighter gauge are assembled to cooperate with the U-shaped frame 20 to provide box beams 22 which extend upon the outside faces of the U-shaped frame intermediate the wheels of the vehicle.

Adjacent the outer ends of the legs of the U-shaped frame are positioned stub axles 23 on which a pair of the wheels 2 are adapted to be journalled and which leave the open end of the U unobstructed for the movement of the platform as well as for the introduction and removal of loads to and from the latter.

Adjacent the base of the U-shaped frame is a modified tier-lift mechanism including the telescoping trackway assembly 10 previously referred to and which is composed of vertically extending channel members 25 welded or otherwise rigidly affixed to the inside walls of the U-shaped frame. Disposed between these relatively stationary channel members is another set of channels 26 which are connected at their upper ends by a transverse beam 27 and which have metal angles 28 rigidly fastened throughout the upper half of their extent on their faces respectively proximate to each of the relatively stationary channel members 25.

The outer channel members 25 have fixed rollers 29 which are adapted to engage the angles 28 to afford roller guides therefor.

The lower ends of the inner channel members 26 are provided with rollers 24 (Fig. 6) adapted to move with the inner channels and which engage the outer relatively stationary channels 25 which constitute a trackway therefor.

There is thus defined a telescoping frame heretofore known in the industrial truck art but which may be raised and lowered without sacrificing the rigidity necessary to resist stresses tending to deflect the assembly from its vertical disposition.

The platform 8 is supported in vertical traversable relation to the frame 20 by L-shaped arms 30 which have vertical portions 31 on which rollers 32 are journalled in vertical spaced relation for engagement with the inner channels 26 which constitute a trackway therefor. The arms 30 are transversely joined by cross structurals 33 at their ends adjacent the trackways and by a pivot bar 34 adjacent their outer extremities. Associated with the pivot bar 34 are slippers 35 on which the load supporting platform 8 is adapted to bear. Since the platform is rigidly affixed to the slippers 35 and is otherwise unsecured along its length, it is adapted to be tipped or tilted as by a hydraulic jack 36 shown in Fig. 4. Such tipping or tilting of the platform is desirable to facilitate loading and unloading of certain types of loads.

The platform is raised and lowered by means of the hydraulic piston 9 previously referred to which is provided with a cross-head 37 for mounting idle sprockets 38 over which the lifting chains 39 are adapted to ride. At one of their ends the chains are made fast to one of the cross structurals 33 extending between the arms 30 and at their other ends are made fast to some stationary part of the vehicle usually a T bearing 40 (Fig. 6) which is carried on the cylinder of piston 9 for this purpose. It will be seen that the vertical movement of the piston will through the chains 39 be translated into lift of the platform 8 through the associated parts and that for every increment of distance moved vertically by the piston, the platform moves two increments or has a range of movement equal to twice that of the piston.

In the initiation of the movement the arms 30 are lifted along the inner trackways 26 until the crosshead 37 of the piston comes into engagement with the cross beam 27 of the inner trackway during which initial movement the crosshead is steadied and guided by rods 41 which are rigidly secured to the cross beam 27 and which extend downwardly into cooperating recesses in the crosshead to effect sliding engagement therewith. At the limits of this movement the crosshead of the piston bears against the beam 27 and by continuing its upper thrust lifts the inner trackway 26 relative to the outer trackway 25, thus continuing the vertical translation of the platform. In a preferred embodiment of the invention the platform has been afforded a 52 inch lift from a point below the horizontal plane of the axes of the wheels to the highest position at which the hydraulic piston 9 can extend (26" thrust).

The boom hoist 11 is illustrated as comprising a built-up boom 13 (Fig. 7) pivoted to the vertical stanchion 12 upon a horizontal pivot 45 about which it is adapted to be raised and lowered. The raising of the boom is effected by taking up the hoisting hook line 50 until the hook 14, or its associated parts, engages the end of the boom adjacent the sheave 51, so that, continued pull by the line 50 raises the boom. To hold the boom in elevated position so as to free the hook and its associated rigging for hoisting purposes, the line 46 is provided for attachment to the boom at one of its ends, and, after passing around a sheave 47 atop the stanchion 12, is fastened to a spring-actuated self-winding sheave or windlass 48 carried within the interior of the boom. A ratchet wheel and pawl 49 are associated with the windlass so as to permit it to wind in the line 46 as the boom is raised, but to hold the windlass against unwinding until the weight of the boom is again borne by the hoisting hook 14 and line 50 and the pawl is released by manipulation of the lever 44 (Figs. 1 and 2) upon the outside of the boom. In operation, with the pawl free of the ratchet, as the boom is lowered, the spring associated with the windlass is wound-up, and as the boom is raised, automatically drives the windlass to take-up the line.

The line 50 of the hoisting hook 14 is adapted to run over sheaves 51 and 52 interiorly of the boom and over sheave 53 on the post 12. It then runs through the center of the post to fixed sheaves 54 and 55 and from thence to an actuating cylinder (not shown) mounted within one of the box beam sections of the frame. The sheaves 47 and 53 mounted on top of the post 12 are carried on a rotatable frame 56 which has ball bearings 57 (Fig. 7) to allow the sheaves to turn in any position into which the boom 13 is swung.

The truck is steered preferably by making the wheels nearest the operator dirigible. All of the controls for driving and steering the truck, as well as raising and lowering the platform 8, and hoisting hook 14, are disposed in convenient positions adjacent the motor 4 on the operator's platform 5. The truck may be operated to take on, or to discharge, loads and remove them from one place to another at relatively high speed, which may include differences of level coming within the range of traverse of the elevated platform 8, by means of a single operator at these controls.

In the foregoing it is to be seen that a truck of the load-straddling variety of greatly simplified construction has been provided which has the advantage of supporting a load so that its center of gravity of the load is within the four points of suspension of the wheels without interference from cross structurals for the frame, either at chassis level, or overhead, and without interference from wheel axles or the like. The load, being distributed evenly over four wheels, presents reduced unit loading conditions per wheel as compared to conventional types, and makes possible larger diameter wheels and pneumatic tires for high speed movement under road conditions.

I claim:

In an industrial truck for load carrying at high speeds of heavy elongated bodies, the combination of a frame having a section for carrying a power unit to drive the truck, said frame having a bifurcated end to enable the load to be supported centrally of the frame, a plurality of resilient wheels supporting said frame, a U-shaped frame member having the yoke attached to said first frame with the opposed legs thereof extending horizontally towards one end of the truck, an elevator mechanism mounted on said section and having a platform translatable vertically and receivable within the bounds of said bifurcated end, a tubular hoist stanchion mounted on the first frame member, means connected to said hoist stanchion for elevating said stanchion and hoisting loads with said stanchion, said stanchion and elevator platform cooperating to displace a load either laterally or vertically upon said platform particularly when said platform is depressed to the ground, thus resulting in greater stability in loading and unloading whereby said stanchion and platform may be employed to cooperate in the emplacement of a load upon the truck with a decreased chance to tip.

HENRY F. WILMS.

REFERENCES CITED

The following references are of record in the file of this patent:

UNITED STATES PATENTS

| Number | Name | Date |
|---|---|---|
| 1,388,721 | Keeping | Aug. 23, 1921 |
| 1,411,875 | Schroeder | Apr. 4, 1922 |
| 1,435,354 | Weaver | Nov. 14, 1922 |
| 1,451,773 | Hescock | Apr. 17, 1923 |
| 1,831,140 | Romine et al. | Nov. 10, 1931 |
| 1,834,985 | Stoner | Dec. 8, 1931 |
| 1,846,567 | Murray, Jr. | Feb. 23, 1932 |
| 1,914,118 | Goldrick et al. | June 13, 1933 |
| 1,978,170 | Roesner | Oct. 23, 1934 |
| 2,055,747 | Laube et al. | Sept. 29, 1936 |
| 2,259,558 | Evans | Oct. 21, 1941 |
| 2,306,713 | Prucha | Dec. 29, 1942 |
| 2,336,831 | Ashworth | Dec. 14, 1943 |
| 2,369,838 | Minnis | Feb. 20, 1945 |
| 2,387,568 | Drott et al. | Oct. 23, 1945 |